March 25, 1952 R. K. McALPINE 2,590,262

TRUNK FRAME DESIGNATION TRANSFER

Filed Nov. 9, 1950 6 Sheets-Sheet 1

INVENTOR
R. K. McALPINE
BY C. Mattice
ATTORNEY

March 25, 1952 R. K. McALPINE 2,590,262

TRUNK FRAME DESIGNATION TRANSFER

Filed Nov. 9, 1950 6 Sheets-Sheet 2

INVENTOR
R. K. Mc ALPINE
BY C. Mattice
ATTORNEY

March 25, 1952 R. K. McALPINE 2,590,262

TRUNK FRAME DESIGNATION TRANSFER

Filed Nov. 9, 1950 6 Sheets-Sheet 3

INVENTOR
R. K. McALPINE
BY C. Matthie
ATTORNEY

TRUNK FRAME DESIGNATION TRANSFER

Filed Nov. 9, 1950 6 Sheets-Sheet 4

INVENTOR
R. K. McALPINE
BY C. Mathis
ATTORNEY

March 25, 1952 R. K. McALPINE 2,590,262

TRUNK FRAME DESIGNATION TRANSFER

Filed Nov. 9, 1950 6 Sheets-Sheet 5

INVENTOR
R. K. McALPINE
BY C. Mattice
ATTORNEY

March 25, 1952 R. K. McALPINE 2,590,262

TRUNK FRAME DESIGNATION TRANSFER

Filed Nov. 9, 1950 6 Sheets-Sheet 6

INVENTOR
R. K. McALPINE
BY C. Mattice
ATTORNEY

Patented Mar. 25, 1952 2,590,262

UNITED STATES PATENT OFFICE 2,590,262

TRUNK FRAME DESIGNATION TRANSFER

Roderick K. McAlpine, Rutherford, N. J., assignor to Bell Telephone Laboratories, Incorporated, New York, N. Y., a corporation of New York Application November 9, 1950, Serial No. 194,830

9 Claims. (Cl. 179—18)

This invention relates to automatic telephone systems, particularly those in which the automatic switches are operated by common control equipment and has for its object to facilitate interoffice operation.

In a telephone system employing cross-bar type switches, for example, such a system as disclosed in Patent No. 2,585,904 to A. J. Busch granted February 19, 1952, the common control equipment is designed to serve a maximum of 20,000 lines constituting two offices. Where concentrated subscriber areas are served, it is often convenient to locate more than two offices in a building.

While connections between one two-office unit and another two-office unit located in the same building may be handled like any other interoffice call, means is provided in accordance with the present invention to facilitate interunit operation by the provision of special interunit senders which serve as outgoing senders at one unit and as incoming registers at the other unit, thus eliminating pulsing over an interoffice trunk between the two units.

A marker in the second unit, to complete the required connection, must know the trunk link frame on which the incoming trunk appears. Normally it receives the trunk link frame number from the incoming register, which in turn receives this information from means individual to the trunk in the register connector. When an interunit sender is used, no register connector is operated and the information must be derived from the trunk itself. Since no outpulsing circuit is required, the conductors of this circuit are available for transmitting information to the sender. To supplement these conductors, a conductor which is connected directly to a relay winding may also be used.

In accordance with a feature of the invention, these three conductors are terminated at one set of cross-connecting terminals in the trunk circuit. The terminals of a second set are connected to three conditions of battery and ground, one such condition being supplied through the relay winding. These two sets of terminals are cross-connected in accordance with a code representing the frame number. This code requires that one conductor in each case be wired to the terminal of the second set which is connected to the relay winding, while the other two conductors may or may not be wired to the remaining terminals of the second set. Preferably the terminal associated with the relay winding is connected to ground, while the other two terminals are connected to low resistance battery and high resistance battery respectively.

In the sender, primary testing means is provided for testing the three conductors for the presence of the condition supplied through the relay winding after which secondary testing means tests the other conductors for the other condition, the primary and secondary testing means jointly setting up a registration of the trunk frame number, which is later transmitted to the marker.

These and other features of the invention will become more apparent from a consideration of the following description read in connection with the drawings in which.

Reference is made to the above-identified Busch application for a complete description of the establishment of the connection from the calling line to the interunit trunk and from the interunit trunk to the called line.

In the detailed circuits functional designations are employed followed in parenthesis by the number of the figure in which the piece of equipment appears.

Figure 1:
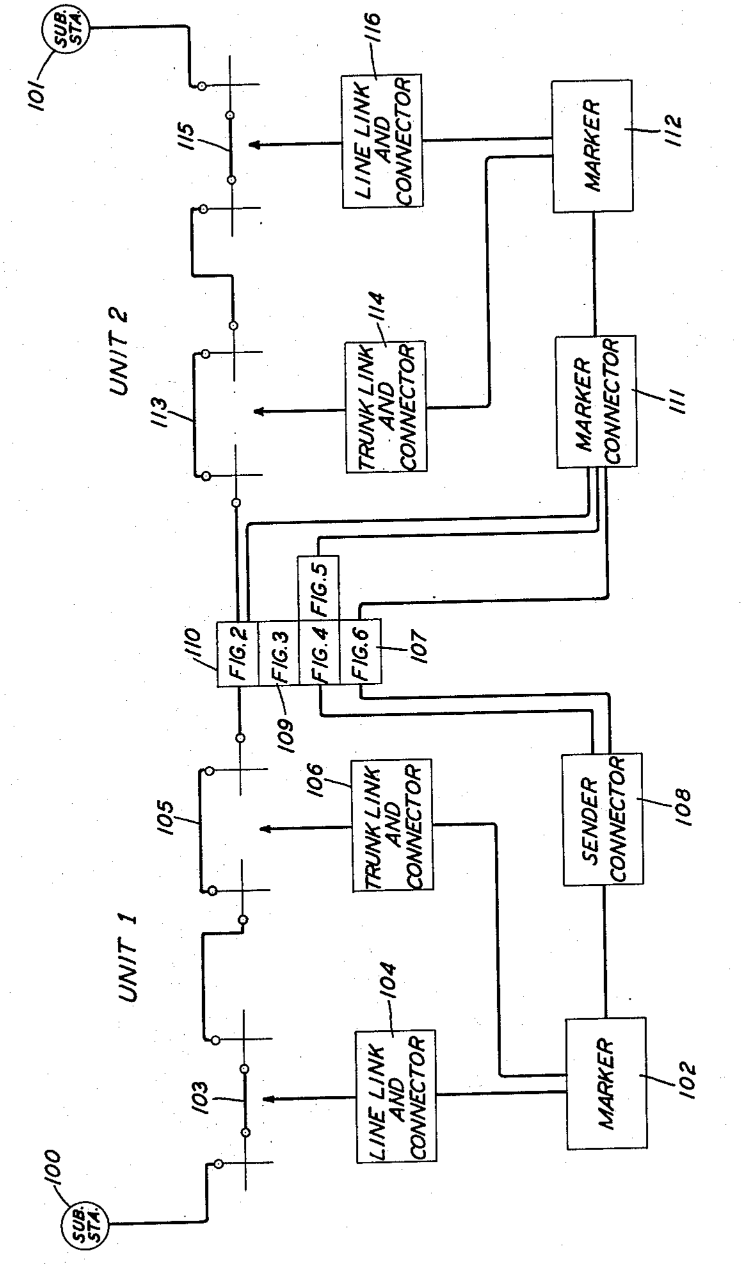
Fig. 1 shows in diagrammatic form the equipment involved in an interunit connection, as well as the arrangement of the other figures.
Figure 4:
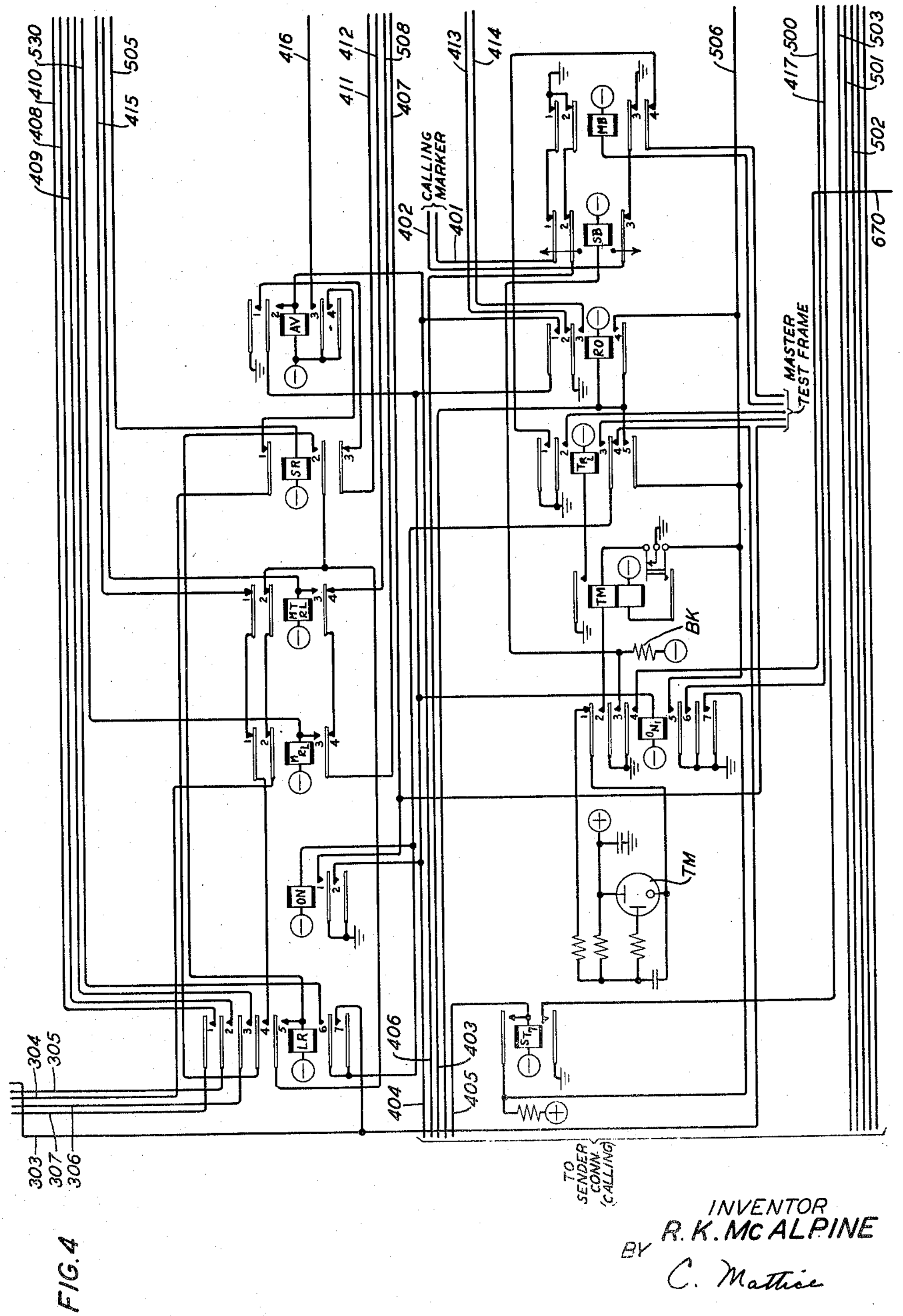
Fig. 4 shows control relays of an interunit sender.

Referring first to Fig. 1, when the subscriber at substation 100 located in unit 1 initiates a call, his line is connected, as described in the above-identified Busch patent with an originating register (not shown) in which he sets up the designation of the wanted line, which will be assumed to be that assigned to substation 101 located in unit 2. The register transfers the designation to an idle marker 102 which connects with the line link frame 103, on which the calling line appears, by means of the line link connector 104 and with the trunk link frame 105, on which an idle trunk 110 leading to the called office appears, by means of the trunk link and connector 106. Since the marker recognizes from the designation that the wanted office is a part of unit 2 it seizes an interunit sender 107 comprising Figs. 4, 5 and 6 by means of sender connector 108, connects the interunit sender 107 with the trunk 110 by means of sender link 109 and transfers the called line number and other information to the sender 107, The marker 102 then selects an idle channel and connects line 100 with trunk 110 by operating switches on line link frame 103 and trunk link frame 105, tests the integrity of the connection and then releases.

After the sender has been connected with the trunk the trunk link frame number is registered in the sender. When the called line number and other information has been registered in the sender 107, the marker 102 checks that the registration is locked in and then indicates to the sender that it may proceed. The sender 107 then operates marker connector 111 to set up a connection with an idle marker 112 and transfers the called line number and the trunk line frame number to the marker 112.

The marker 112 then proceeds as described in the above-identified Busch patent to connect with the designated trunk link frame, for example, frame 113 through trunk link and connector 114. It then causes the line number to be translated into a line location indication by means of a number group circuit (not shown), connects with the proper line link frame 115 by means of line link and connector 116, and tests the called line 101. If line 101 is idle, the marker 112 selects an idle channel and connects trunk 110 with line 101 by operating the switches included in the selected channel on frames 113 and 115. It then tests the integrity of the connection and releases.

*Detailed description*

Figure 2:
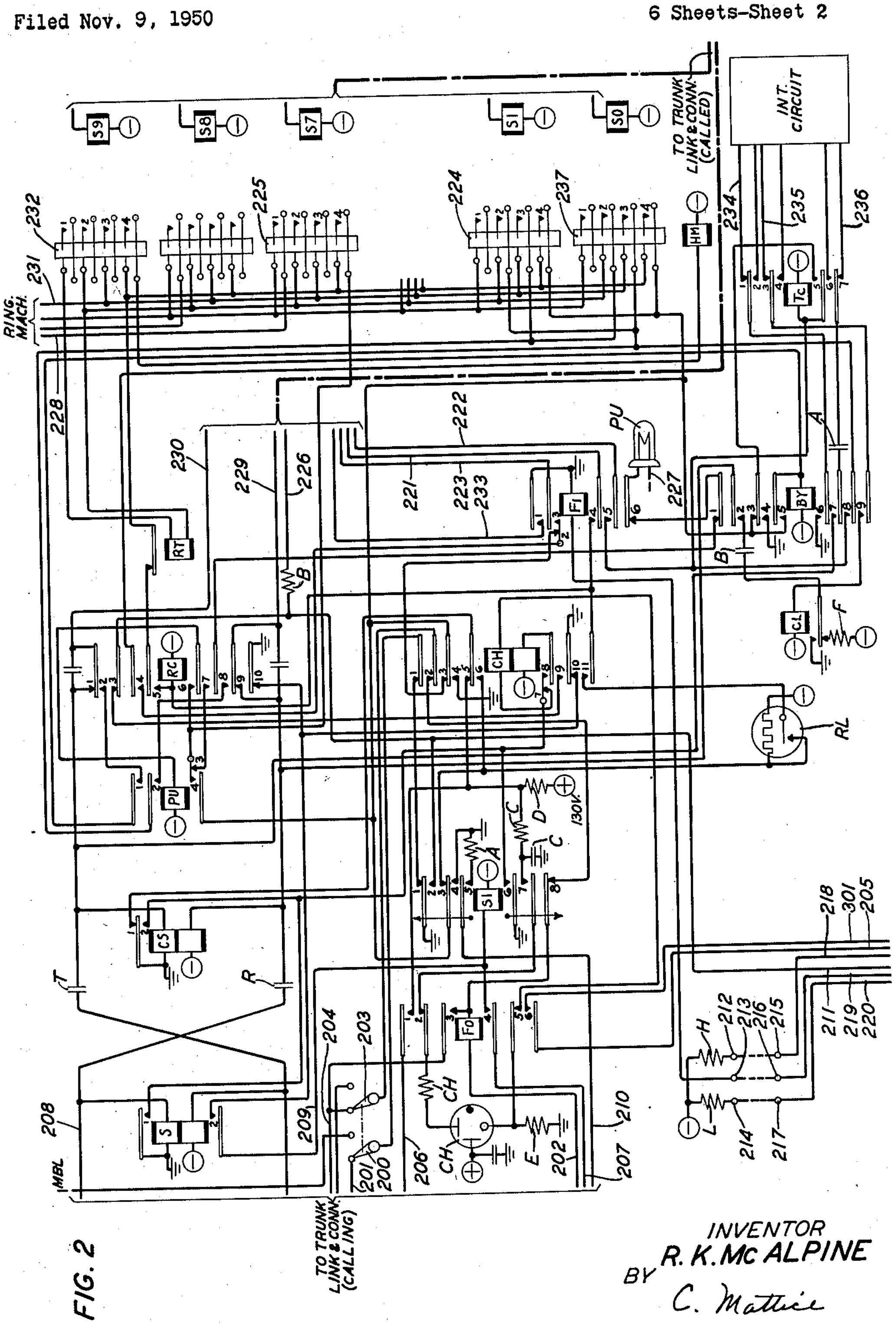
Fig. 2 shows an interunit trunk.

The trunk circuit shown in Fig. 2, when idle, connects ground over contact 1 of relay S1(2), contact 1 of relay CH(2), switch arm 200 to conductor 201 over which the marker in the calling office tests for a trunk link frame on which an idle trunk appears. A connection is also closed from conductor 202, through the winding of relay F0(2), contact 8 of relay S1(2), contact 2 of relay CH(2), switch arm 203 to conductor 204. The marker, having selected the trunk link frame connects battery to conductor 202 and ground to conductor 204 through a high resistance testing circuit and then, assuming that this trunk is selected, reduces the resistance in the circuit to operate relay F0(2) which locks over its contact 3 to conductor 204, thereby becoming independent of relays S1(2) and CH(2). Relay F0(2) closes a circuit from ground at contact 1 of relay CS(2), contact 5 of relay CH(2), contact 1 of relay F0(2) to conductor 206 to operate a relay individual to the trunk in the calling trunk link and connector circuit to enable the marker to set up the connection. Relay F0(2) also disconnects the upper winding of relay CH(2) and condenser C(2) from tube CH(2) to prevent operation of that tube.

At the same time that the marker is testing for a trunk link frame having an idle trunk terminating thereon, of the type indicated by the route relay, it is testing for a group of senders including at least one idle sender of the type indicated by the route relay. The group test leads 401 and 402 are grounded over contacts 1 and 3 of relays MB(4) and SB(4) whenever the sender is idle. Having selected a group of senders and operated the associated sender connector the marker tests for an individual sender, which is marked idle by the connection of ground over contacts 2 of relays MB(4) and SB(4) to conductor 403. Having selected the sender shown, the marker connects ground to conductor 404, operating relay ON1(4) which in turn operates relay SB(4) to disconnect ground from conductors 401, 402 and 403 to mark the sender busy to other markers.

When the marker has operated the trunk link connector giving access to the frame on which the trunk of Fig. 2 is located, it operates select magnet SS0(3) individual to the selected sender to prepare the corresponding cross-points of the sender link switch and grounds conductor 300. With select magnet SS0(3) and relay F0(2) in the trunk circuit operated, a circuit is completed from ground on conductor 300, auxiliary contact of magnet SS0(3), conductor 301, contact 6 of relay F0(2), conductor 205 to battery through the winding of hold magnet HM0(3) individual to the trunk of Fig. 2. With hold magnet HM0(3) operated the cross-point 302 is closed connecting the trunk circuit with the sender by means of four paths. In addition the operating ground for magnet HM0(3) is extended over contact 5 of cross-point 302, conductor 303, contact 4 of relay TRL(4) to battery through the winding of relay ON(4). Relay ON(4) operates and at its contact 2 closes a holding circuit for relay ON1(4).

At its contact 1, relay ON(4) closes a circuit for checking that the trunk link frame number receiving relays are normal. This circuit may be traced from ground at contact 1 of relay ON(4), conductor 407, contact 8 of relay D(5), contact 8 of relay R(5), contact 8 of relay T(5), conductor 505 to battery through the winding of relay SR(4). Relay SR(4) operates in this circuit.

Figure 6:
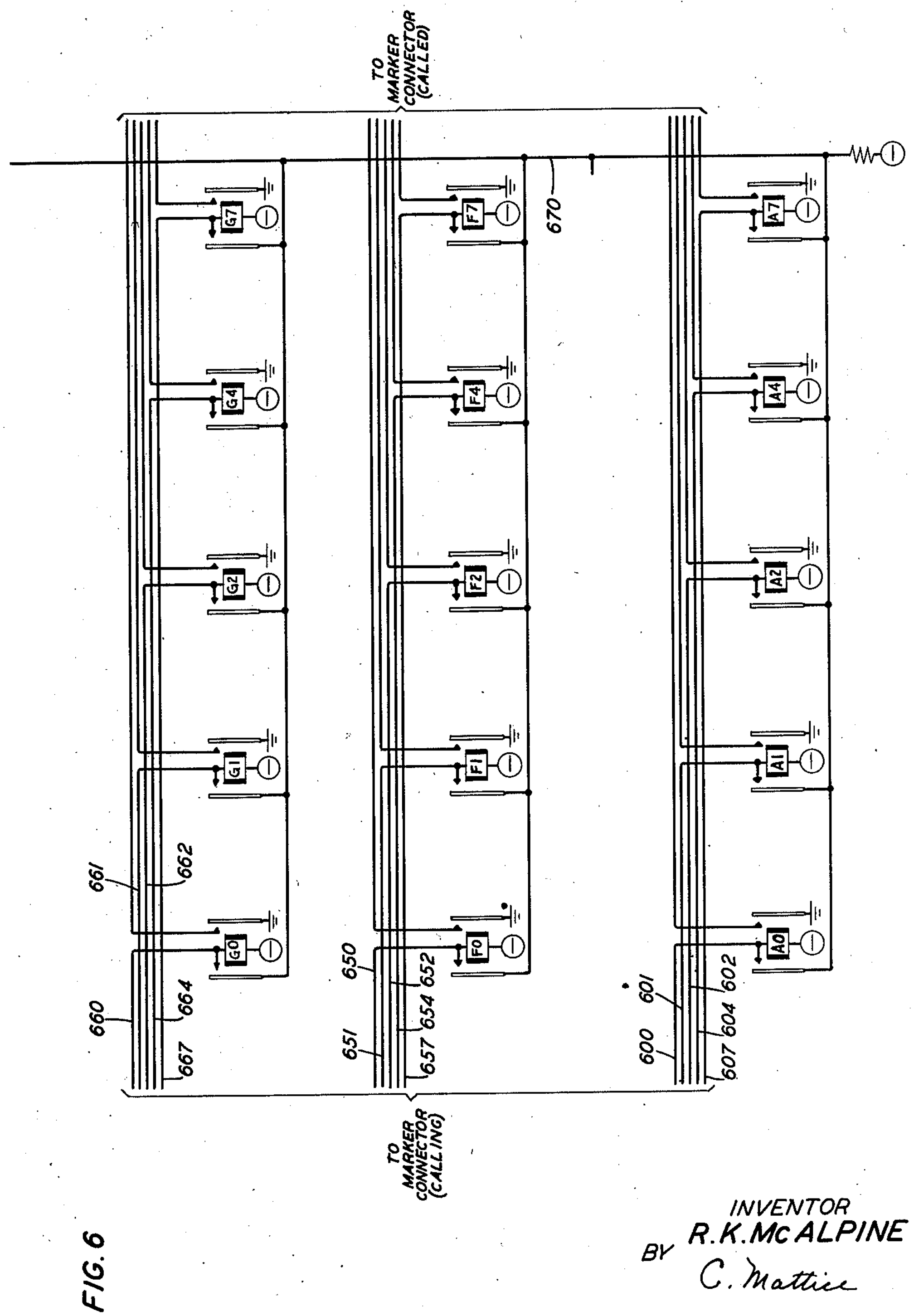
Fig. 6 shows a part of the digit registers.

With the marker in unit 1 connected to the sender through the sender connector, the marker transfers the called line number to the sender by grounding the conductors leading to the register relays of the sender in accordance with the two-out-of-five code. In Fig. 6 three of the seven sender registers are shown, that is, the A register and the F and G registers for recording the first, sixth and seventh digits. The registers which are not shown are arranged in the same manner as those shown. If the call is to be completed, as assumed, in one of the offices of unit 2, a complete designation of seven digits will be registered and all seven registers will be used. It is, of course, to be understood that if there are other offices in the area which use five digit numbers, an eighth register would be provided.

The conductors grounded and the register relays operated, to register the various digits in the first or A register, are shown in the following table:

| Digit to be Registered | Conductors Grounded | Register Relay Operated |
|---|---|---|
| 0 | 604, 607 | A4, A7 |
| 1 | 600, 601 | A0, A1 |
| 2 | 600, 602 | A0, A2 |
| 3 | 601, 602 | A1, A2 |
| 4 | 600, 604 | A0, A4 |
| 5 | 601, 604 | A1, A4 |
| 6 | 602, 604 | A2, A4 |
| 7 | 600, 607 | A0, A7 |
| 8 | 601, 607 | A1, A7 |
| 9 | 602, 607 | A2, A7 |

Assuming that the digit 4 is the first digit of the wanted line number, conductors 600 and 604 will be grounded and relays A0(6) and A4(6) will be operated. Relays A0(6) and A4(6), as well as the other operated register relays lock over conductor 670 to ground at contact 4 of relay ON1(4). The connection of this locking ground to conductors 600 and 604 is an indication to the marker that the designation has been properly recorded.

lay D(5) to battery through the winding of relay D(5); from ground through the winding of relay F1(2), terminal 213 cross-connected to terminal 216, conductor 219, contact 2 of cross-point 302, conductor 306, contact 3 of relay LR(4), conductor 409, contact 14 of relay D(5), contact 1 of relay T(5), contact 6 of relay R(5) to battery through the winding of relay R(5); from battery through low resistance L(2), terminal 214 cross-connected to terminal 217, conductor 220, contact 1 of cross-point 302, conductor 307, contact 1 of relay LR(4), conductor 410, contact 1 of relay R(5), contact 1 of relay D(5), contact 6 of relay T(5) to battery through the winding of relay T(5).

Since battery is connected to the windings of all three primary tests relays T(5), R(5) and D(5), it is clear that only relay R(5), the circuit of which has been extended to ground through the winding of F1(2) can operate. Relay R(5) operated, locks over its contact 7 and conductor 506 to ground at contact 5 of relay ON1(4). At its contact 6, relay R(5) opens its operating circuit and at its contact 5 extends conductor 409 over contact 3 of relay SRT(5) to conductor 507 leading to the marker connector. It may be noted that the resistance of relays T(5), R(5) and D(5) is sufficient to prevent the operation of relay F1(2) when connected therewith.

With relay R(5) operated, conductors 408 and 410 are extended to the secondary test relays TS(5), TMG(5), RS(5) and RMG(5). Conductor 408 is extended over contact 14 of relay T(5), contact 13 of relay R(5) to ground through the windings of relays RS(5) and marginal relay RMG(5) in parallel. In addition conductor 410 is extended over contact 2 of relay R(5) to ground through the windings of relays TS(5) and marginal relay TMG(5) in parallel.

It will be remembered that battery through high resistance H(2) was connected to conductor 408. Therefore only relay RS(5) is operated over this conductor. Battery through low resistance L(2) was connected to conductor 410, so that relays TS(5) and TMG(5) both operate.

With relays TS(5) and TMG(5) operated, a circuit is closed from ground over contact 2 of relay TS(5), contact 2 of relay TMG(5), to conductor 520. With relay RS(5) operated and RMG(5) not operated, a circuit is closed from ground over contact 2 of relay RS(5), contact 1 of relay RMG(5), contact 10 of relay R(5) to conductor 522. In addition, relay R(5) closes a circuit from ground over its contact 12 to conductor 511. Therefore, conductors 511, 520 and 522 are grounded to identify frame No. 12 as set forth in column 6.

To further illustrate the operation of the frame registering relays, the operation of these relays in registering frames Nos. 18, 6 and 7 will also be outlined. For frame 18, terminal 213 will be connected to terminal 216, and terminal 214 connected to terminal 215 while terminals 212 and 217 will be left disconnected. Referring to the testing circuits previously traced, ground will therefore be connected to conductor 409 and low resistance battery to conductor 408. With ground on conductor 409, relay R(5) will operate, lock, extend conductor 409 to conductor 507 and extend conductor 408 to the windings of relays RS(5) and RMG(5) as previously described, while no circuit is closed for relays TS(5) and TMG(5). Since low resistance battery is connected to conductor 408 both relay RS(5) and relay RMG(5) will operate.

Relay R(5) grounds conductor 511 as above traced. With relay TS(5) not operated, a circuit is closed from ground over contact 1 of relay TS(5), contact 3 of relay R(5), to conductor 521. With both relays RS(5) and RMG(5) operated a circuit is closed from ground over contacts 2 of relays RS(5) and RMG(5) to conductor 527. Therefore, conductors 511, 521 and 527 are grounded to identify frame No. 18.

For frame No. 6, terminal 213 is connected to terminal 217 and terminal 212 to terminal 216, leaving terminals 214 and 215 disconnected. Ground is therefore connected to conductor 410 and high resistance battery to conductor 409. When the circuits to relays T(5), R(5) and D(5) are closed, relay T(5) operates over conductor 410 and locks to conductor 506. Conductor 408 is extended over contact 13 of relay T(5) to the windings of relays RS(5) and RMG (5), while conductor 409 is extended over contact 14 of relay D(5), and contact 2 of relay T(5) to the windings of relays TS(5) and TMG(5). Since the circuit of relays RS(5) and RMG(5) is not completed at the cross-connecting terminals neither of these relays is operated, and since high resistance H(2) is included in the circuit of relays TS(5) and TMG(5) only relay TS(5) operates. In a manner similar to that described in connection with relay R(5), with relay T(5) operated, conductor 410 is extended over contacts 1 of relays R(5) and D(5), contact 5 of relay T(5), contact 3 of relay SRT(5) to conductor 507. Relay T(5) closes a circuit from ground over its contact 12 to conductor 510. Relay TS(5) closes a circuit over its contact 2, contact 1 of relay TMG(5), contact 4 of relay T(5) to conductor 522. With relay RS(5) not operated a circuit is closed from ground over contact 1 of relay RS(5), contact 11 of relay T(5) to conductor 524. Therefore, conductors 510, 522 and 524 are grounded to identify frame No. 6.

For frame No. 7, terminal 213 is connected to terminal 215 and the other terminals are left disconnected. Therefore, ground is connected to conductor 408 and relay D(5) is operated. Relay D(5) locks and extends conductor 408 over its contact 5 and contact 3 of relay SRT(5) to conductor 507. In addition, relay D(5) extends conductor 409 over its contact 13 to the windings of relays RS(5) and RMG(5) and conductor 410 is extended over contact 1 of relay R(5) and contact 2 of relay D(5) to the windings of relays TS(5) and TMG(5). Since battery is connected to neither of these conductors, none of these secondary test relays are operated. Ground is connected over contact 12 of relay D(5), contact 4 of relay TMG(5), contact 4 of relay RMG to conductor 510; ground is connected over contact 1 of relay TS(5), contact 3 of relay D(5) to conductor 520 and ground is connected over contact 1 of relay RS(5), contact 11 of relay D(5) to conductor 527, thereby marking conductors 510, 520 and 527 with ground to identify frame No. 7.

As soon as one of the primary test relays operates, the circuit of relay SR(4) is opened and that relay releases. With relay SR(4) released and relay AV(4) operated, a circuit is closed from battery over contact 4 of relay AV(4), contact 1 of relay SR(4), contact 4 of relay LR(4), contacts 1 of relays MRL(4) and MTRL(4) conductor 415, contact 4 of relay ND(5) to conductor 531 leading to the marker connector of unit 2 causing that connector to operate to select an idle marker and connect it with the interunit sender. Battery is also supplied to the marker In addition the marker connects ground to conductor 405, operating relay ST7(4) to indicate that the last digit was registered on the G register. Relay ST7(4) locks to ground at contact 7 of relay ON1(4).

Furthermore, the marker may ground one or more of the conductors 501, 502 and 503 to set up a class indication by operating one or more of relays CL1(5), CL2(5) and CL3(5). If any of these relays is operated, it locks over conductor 500 to ground over contact 6 of relay ON1(4). For a locally terminated call none of these relays is operated. Relays ND(5) and SRT(5) are used only in connection with test calls.

When the marker is ready to complete the connection between the calling link and the trunk, it connects ground through the calling trunk link and connector to conduct 207, completing a circuit over contact 4 of relay F0(2) to battery through the winding of relay S1(2).

When the marker has set up and checked the connection between the calling line and the trunk, it connects ground to conductor 406, operating relay AV(4). Relay AV(4) locks over its contact 2 to ground at contact 2 of relay ON(4). The closure of this locking circuit causes the marker to release relay F0(2) and the calling trunk link and connector circuit after which the marker returns to normal.

The release of relay F0(2) disconnects ground from conductor 206 to connect the calling line through to the tip and ring conductors 208 and 209 of the trunk, thereby operating relay S(2). Relays S(2) closes a holding circuit for relay lay S1(2) also closes a circuit from ground over its contact 2, conductor 211, contact 3 of cross-point 302, conductor 304, contacts 2 of relays MRL(4) and MTRL(4), contact 2 of relay SR(4) to battery through the winding of relay LR(4). Relay LR(4) operates and locks over its contact 5 to its operating circuit independent of relay SR(4).

Figure 3:
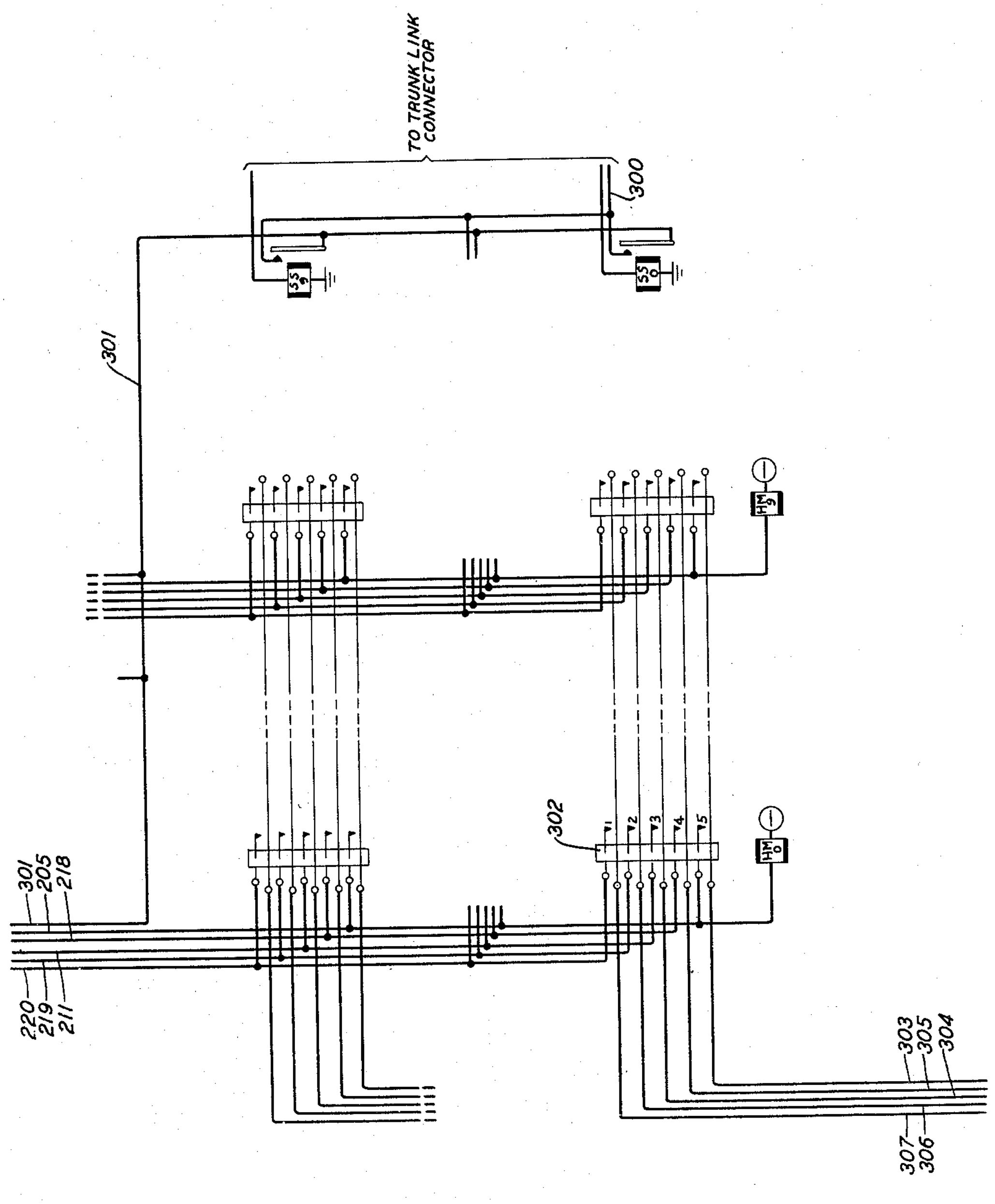
Fig. 3 shows a sender connector.

With relay LR(4) operated the circuits for identifying the trunk link frame are closed. Each interunit trunk is provided with a set of cross-connecting terminals 212 to 217. Terminal 212 is connected to battery through high resistance H(2) and terminal 214 is connected to battery through low resistance L(2) while terminal 213 is connected to ground through the winding of relay F1(2). Terminals 215 to 217 are connected to conductors 218, 219 and 220 which are extended through the sender link of Fig. 3 to the interunit sender. Terminal 213 is always cross-connected to one of the terminals 215 to 217 and one, both or neither of terminals 212 and 214 are connected to the other terminals of the group 215 to 217.

When a trunk is assigned to a frame the cross-connections above outlined are wired to provide a code indication to the sender of the frame on which the trunk appears.

The following table indicates the cross-connections for the various frame numbers and in addition shows the sender test relays operated and the conductors leading to the marker of unit 2 grounded as a result. The operation of the sender relays will be described hereinafter.

| Frame No. | Connections to Conductors— | | | Sender Relays Operated— | | Conductors to Marker Grounded |
|---|---|---|---|---|---|---|
| | 218 | 219 | 220 | Primary | Secondary | |
| 0 | F | | H | D | TS — — — | 510, 524, 527 |
| 1 | F | H | | D | — — RS — | 510, 520, 521 |
| 2 | H | L | F | T | TS TMG RS — | 510, 520, 522 |
| 3 | H | | F | T | — — RS — | 510, 521, 522 |
| 4 | | L | F | T | TS TMG — — | 510, 520, 524 |
| 5 | | | F | T | — — — — | 510, 521, 524 |
| 6 | | H | F | T | TS — — — | 510, 522, 524 |
| 7 | F | | | D | — — — — | 510, 520, 527 |
| 8 | L | | F | T | — — RS RMG | 510, 521, 527 |
| 9 | L | H | F | T | TS — RS RMG | 510, 522, 527 |
| 10 | F | L | H | D | TS — RS RMG | 511, 524, 527 |
| 11 | F | H | L | D | TS TMG RS — | 511, 520, 521 |
| 12 | H | F | L | R | TS TMG RS — | 511, 520, 522 |
| 13 | H | F | | R | — — RS — | 511, 521, 522 |
| 14 | | F | L | R | TS TMG — — | 511, 520, 524 |
| 15 | | F | | R | — — — — | 511, 521, 524 |
| 16 | | F | H | R | TS — — — | 511, 522, 524 |
| 17 | F | L | | D | — — RS RMG | 511, 520, 527 |
| 18 | L | F | | R | — — RS RMG | 511, 521, 527 |
| 19 | L | F | H | R | TS — RS RMG | 511, 522, 527 |

S1(2) which may be traced from battery through the winding of relay S1(2), contact 2 of relay S(2) to ground at contact 10 of relay RC(2) or at contact 10 of relay CH(2). Relay S1(2) is slow to release so that it remains operated between the release of relay F0(2) and the operation of relay S(2).

When relay S1(2) operates it opens, at its contacts 1 and 8, the circuits over which the trunk is marked idle to continue to mark the trunk busy to markers, and at its contact 5 connects ground through resistance A(2) to conductor 210 to close a holding circuit for the hold magnets of the switches when the connection is completed. In addition relay S1(2) connects ground over its contact 2 through resistance B(2) to conductor 226 to prepare a circuit for holding the hold magnets of the connection in the called office when that connection has been established. Re- Assuming that the trunk of Fig. 2 is located on frame No. 12, the cross-connections between terminals 212 to 214 and 215 to 217 will be as indicated. When cross-point 302 is closed, conductors 218 to 220 are connected to conductors 305 to 307, respectively. When relay LR(4) is operated as above described, conductors 305 to 307 are connected to conductors 408 to 410, respectively, which extend to the primary test relays of Fig. 5.

Figure 5:
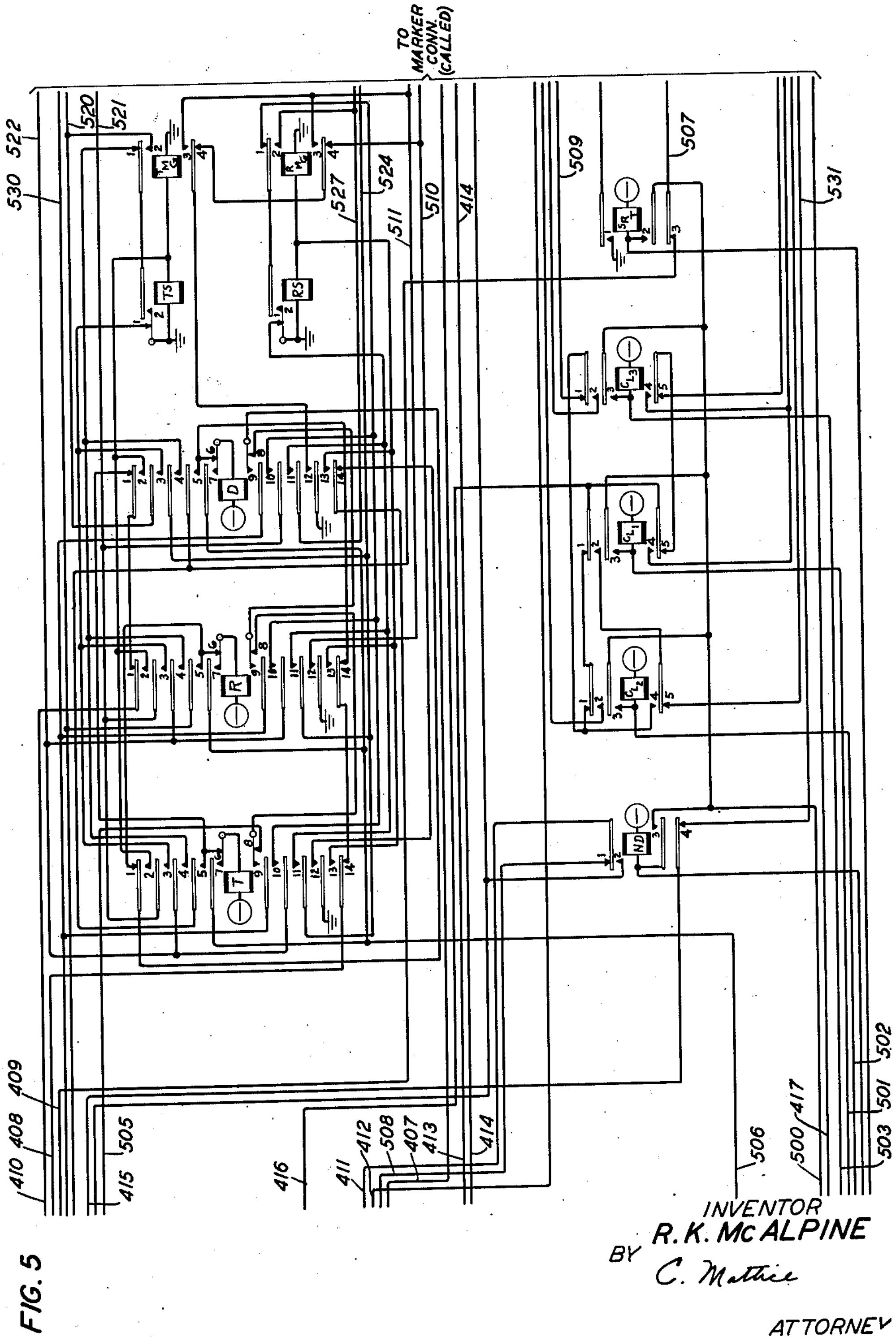
Fig. 5 shows the trunk frame number test relays and the class register.

Therefore three primary testing circuits are closed between the cross-connections at the trunk and the relays of Fig. 5. These circuits may be traced as follows: from battery through high resistance H(2), terminal 212, cross-connected to terminal 215, conductor 218, contact 4 of cross-point 302, conductor 305, contact 2 of relay LR(4), conductor 408, contact 14 of relay T(5), contact 14 of relay R(5), contact 6 of reconnector of unit 2 over contact 3 of relay AV(4) and conductor 416. In addition, a circuit is closed from ground over contact 1 of relay AV(4), contact 3 of relay SR(4), conductor 411, contact 1 of relay ND(5), conductor 508, contacts 4 of relays MRL(4) and MTRL (4), conductor 412 to the marker connector of unit 2, to operate timing equipment in that circuit. The conductors grounded by the register relays of Fig. 6 and by the frame test relays of Fig. 5 are extended to corresponding registers in the marker to set up a registration in that circuit of the wanted line number, and the trunk link frame number. In addition, a class indication is sent to the marker over a circuit from grounded contact 2 of relay R0(4), conductor 413, contacts 1 of relays CL1(5), CL2(5) and CL3(5) to conductor 509, it having been assumed that none of the class relays were operated. Relay ST7(4) also grounds conductor 416 to operate a corresponding relay in the marker.

The marker responds to the registration of the trunk link frame number to operate the trunk link connector associated with that trunk link frame and then connects low resistance battery to conductor 507, which extends as above traced to the winding relay F1(2) and ground. Relay F1(2) connects ground to conductor 233 to operate a relay in the trunk link and connector of unit 2 to identify the trunk and permit the marker to set up and test the connection to the called line.

The marker, having found the called line idle and determined the type of ringing current required by the called line, operates one of the select magnets S0(2) and S1(2) to determine the side of the line to which the current should be applied, and one of the select magnets S2 (not shown) to S9(2) to select the proper ringing code. By way of example, assume that select magnets S0(2) and S7(2) are operated. The marker then connects ground to conductor 221, completing a circuit over contact 4 of relay F1(2) to battery through the winding of relay RC(2). Relay RC(2) operates and prepares for ringing the called line. In addition, if the called line is not one to which calls are free, the marker connects ground to conductor 222, completing a circuit over contact 5 of relay F1(2) to battery through the winding of relay TC(2). Relay TC(2) operates and locks over its contact 5, contact 3 of relay BY(2) to ground over contact 4 of relay S1(2).

The marker, having operated relay RC(2) connects ground to conductor 223, completing a circuit over contact 3 of relay F1(2), contact 4 of relay RC(2) to battery through the winding of hold magnet HM(2) of the ringing switch. With magnet HM(2) operated the cross-points 224 and 225, prepared by select magnets S0(2) and S7(2), are closed. A locking circuit for relay RC(2) is now completed from battery through the winding of relay RC(2) and over its contact 5, contact of relay RT(2), contact 4 of cross-point 224, contact 4 of relay S1(2) to ground. Ground on this locking circuit provides an indication to the marker that the ringing switch has been operated.

Cross-point 225 supplies a one-ring code and therefore a circuit is closed from ground at contact 4 of relay S1(2), contacts 4 of cross-points 224 and 225, contact 6 of relay RC(2), to battery through the winding of relay PU(2). Relay PU(2) therefore operates at once and locks in a circuit from battery through its winding, contact 6 of relay RC(2), contact 4 of relay PU(2) to ground at contact 4 of relays S1(2). For other codes corresponding to other cross-points, this circuit is not closed and relay PU(2) does not operate until relay F1(2) has been released, at which time a circuit is closed from battery through the winding of relay PU(2), contact 6 of relay RC(2), contact 3 of relay PU(2), contact 7 of relay RC(2), contact 1 of relay BY(2), contact 6 of relay F1(2), resistance lamp PU(2) to conductor 227 leading to the pick-up interrupter of the ringing machine. When that contact closes, relay PU(2) operates and locks over the circuit above traced.

With relay PU(2) operated, the source of ringing current connected to conductor 228 is connected over contact 1 of cross-point 225, winding of relay RT(2), contact 2 of cross-point 224, contact 2 of relay PU(2), contact 8 of relay RC(2) to the ring conductor 229, while ground from the ringing machine is connected over conductor 231, contact 3 of cross-point 224, contact 1 of relay PU(2), contact 2 of relay RC(2) to the tip conductor 230.

The marker establishes the connection between the trunk circuit of Fig. 2 and the called line in the manner described in the previously identified Busch patent and then releases relay F1(2) to release the relay in the trunk link and connector and extend conductors 229 and 230 to the called line, operating the ringer on that line.

When the marker completes its functions it connects ground to conductor 530 leading to the sender, thereby operating relay MRL(4). Relay MRL(4) closes a locking circuit for itself over its contact 3, conductor 508, contact 1 of relay ND(5), conductor 411, contact 3 of relay SR(4) to ground at contact 1 of relay AV(4). Relay MRL(4) operated opens the operating circuit for the marker connector of unit 2 and the connector and marker both release. Relay MRL(4) at its contact 2 opens the locking circuit of relay LR(4) and that relay releases, in turn opening the locking circuit of relay ON(4) which releases. Relay ON(4) releases relay ON1(4) and relay AV(4). The release of relay ON1(4) removes the off-normal grounds, permitting all of the register relays to release. With relay AV(4) released, relay MRL(4) releases and the sender is restored to normal. Relay ON1(4) also opens the circuit of relay SB(4), but, since battery through resistance BK(4) is connected in parallel with the winding of relay SB(4) that relay is slow in releasing to insure that all of the other relays of the sender have released before the idle marking is restored.

When the subscriber at the called line answers, relay RT(2) operates, opening the locking circuit of relay RC(2) which releases, in turn releasing relay (PU(2) and hold magnet HM(2) and disconnecting ringing current from the called line. With relay RC(2) released, tip conductor 230 is extended over contact 1 of relay RC(2) to ground through the upper winding of the called supervisory relay CS(2) and ring conductor 229 is connected over contact 9 of relay RC(2) to battery through the lower winding of relay CS(2). Talking currents pass through condensers T(2) and R(2). Relay RC(2) released closes a supplementary holding ground for relay S1(2).

Relay CS(2) operates over the called line and disconnects the ground previously connected over contact 5 of relay CH(2) through resistance C(2) to condenser C(2). Condenser C(2) now charges through resistance C(2) and D(2) from +130-volt battery. Condenser C(2) is connected over contact 7 of relay S1(2) and contact 2 of relay F0(2) through resistance CH(2) to the control electrode of tube CH(2). When the charge on condenser C(2) reaches the breakdown potential of tube CH(2) the control gap breaks down, the main gap becomes conducting and relay CH(2) operates in a circuit which may be traced from ground at contact 2 of relay CS(2), contact 7 and upper winding of relay CH(2), contact 5 of relay F0(2) to +130-volt battery across the main gap of tube CH(2). Relay CH(2) closes a locking circuit for itself from battery through its lower winding, contact 8 of relay CH(2) to ground at contact 2 of relay CS(2), contact 1 of relay S(2) or contact 6 of relay S1(2). At its contact 7, relay CH(2) opens its operating circuit to quench tube CH(2). At contact 10, relay CH(2) removes the holding ground from relay S1(2) leaving that relay under the control of relays S(2) and RC(2).

If the marker of unit 2 encounters trouble it releases the sender by operating relay MTRL(4) which performs the same functions as relay MRL(4). If the marker of unit 1 encounters trouble, it will operate reorder relay R0(4), before releasing the sender connector. Relay R0(4) locks under the control of relay ON1(4), operates relay AV(4) to call in a marker of unit 2 and grounds conductor 414 to cause that marker to set the trunk circuit for an overflow signal. Tube TM(4) and relays TM(4) and TRL(4) serve to release the sender if it fails to release normally.

If the marker of unit 2 finds the called line busy it operates relay RC(2) as above described, but does not operate relay TC(2). In addition, it operates select magnets S1(2) and S9(2) of the ringing selection switch. Relay RC(2) operates hold magnet HM(2) as before, thereby closing cross-points 224 and 232. With cross-point 232 closed, a circuit is closed from ground over contact 4 of relay S1(2), contact 4 of cross-point 224, contact 4 of cross-point 232, to battery through the winding of relay BY(2).

Relay BY(2) operates and locks over its contact 5 to ground over contact 4 of relay S1(2). Relay BY(2) at its contact 6 connects ground over contact 1 of relay TC(2) to conductor 234 to start the busy back interrupter. Relay BY(2) closes a circuit from busy tone on conductor 236 from the interrupter over contact 7 of relay TC(2), condenser A, contact 7 of relay BY(2) to condenser T(2) and thence to the calling line. In addition it closes a circuit from interrupted ground on conductor 235, contact 3 of relay TC(2), contact 9 of relay BY(2) to the winding of relay CL(2). As relay CL(2) operates and releases it alternately connects ground and battery through resistance F(2) to condenser B(2) which is connected over contact 2 of relay BY(2) to condenser R(2) thereby simulating the clicks of reverse battery flashes for use by the service observing operator.

If the marker cannot complete the connection because no idle channel is available or receives a reorder signal over conductor 414, it operates relay RC(2) as well as select magnets S1(2) and S9(2) so that cross-points 232 and 237 are closed. Relay BY(2) operates as previously described. With cross-point 237 closed, a circuit is closed from battery through the winding of relay TC(2), contact 8 of relay BY(2), contact 3 of cross-point 237, to generator ground on conductor 231. Relay TC(2) operates and locks over its contact 5 to ground at contact 4 of relay BY(2). With relay TC(2) operated, the start, tone and interrupted ground circuits are transferred to the overflow interrupter which provides tone and interruptions characteristic of a path's busy condition.

The tunk circuit is released when both subscribers hang up releasing the calling supervisory relay S(2) and the called supervisory relay CS(2). Relay S(2) releases relay S1(2) and with relays S(2), CS(2) and S1(2) released, relay CH(2) releases. If the call is not completed and relay BY(2) is operated alone or with relay TC(2), the release of relay S1(2) releases relay BY(2) which releases relay TC(2).

If release by one subscriber is not followed promptly by release by the second subscriber, means is provided for timed release of the trunk circuit. If the called subscriber hangs up first, relay CS(2) releases closing a circuit from ground over its contact 1 and contact 6 of relay CH(2) to battery through the heating element of thermal relay RL(2). When the contact of relay RL(2) closes, ground is extended over contact 11 of relay CH(2) to battery through the winding of relay RC(2). Relay RC(2) operates, opening the circuit of relay S1(2) which releases and disconnects ground from conductor 210 to permit the switches in unit 1 to release. The release of the switches in unit 1, opens the circuit of relay S(2) thereby permitting relay CH(2) to release, release the switches in unit 2, and cause the trunk circuit to return to normal. Since relay CH(2) is operated when relay RC(2) operates at this time, the hold magnet HM(2) of the ringing selection switch cannot operate.

If the calling subscriber hangs up first, relays S(2) and S1(2) release, but relay CS(2) holds relay CH(2) operated. The release of relay S1(2) releases the switches in unit 1 but the switches of unit 2 are held by ground connected to conductor 226 through resistance B(2), contact 3 of relay RC(2) and contact 9 of relay CH(2). Relay S1(2) closes a circuit from ground over contact 4 of relay CH(2), contact 3 of relay S1(2) to battery through the heating element of thermal relay RL(2). When the contact of thermal relay RL(2) closes, relay RC(2) operates, disconnecting ground from conductor 226 to release the switches of unit 2. The release of the switches causes relay CS(2) to release in turn releasing relay CH(2) and restoring the trunk circuit to normal.

What is claimed is:

1. In a telephone system, means for transmitting designations comprising three conductors, means for marking said conductors with battery or ground in a code representing one of said designations, primary test means for testing said conductors for one of said markings, secondary test means for testing said conductors for the other of said markings, means under the control of said primary test means to connect certain of said conductors to said secondary test means, a register and means under the control of said primary test means and said secondary test means to operate said register in accordance with a different code also representing said designation.

2. In a telephone system, means for transmitting designations comprising three conductors, means for marking said conductors with battery or ground in a code representing one of said designations, primary test relays for testing said conductors for one of said markings, secondary test relays for testing said conductors for the other of said markings, means under the control of said primary test relays to connect certain of said conductors to said secondary test relays, a register and means under the control of said primary test relays and said secondary test relays to operate said register in accordance with a different code also representing said designation.

3. In a telephone system, means for transmitting designations comprising three conductors, means for marking said conductors with battery or ground in a code representing one of said designations, primary test means for testing said conductors for said ground marking, secondary test means for testing said conductors for said battery marking, means under the control of said primary test means to connect certain of said conductors to said secondary test means, a register and means under the control of said primary test means and said secondary test means to operate said register in accordance with a different code also representing said designation.

4. In a telephone system, means for transmitting designations comprising three conductors, means for marking said conductors with battery or ground in a code representing one of said designations, primary test relays for testing said conductors for said ground marking, secondary test relays for testing said conductors for said battery marking, means under the control of said primary test relays to connect certain of said conductors to said secondary test relays, a register and means under the control of said primary test relays and said secondary test relays to operate said register in accordance with a different code also representing said designation.

5. In a telephone system, means for transmitting designations comprising three conductors, means for marking one of said conductors with ground and one or both or neither of said other conductors with battery in a code representing one of said designations, primary test relays for testing said conductors for said ground marking, secondary test relays for testing said conductors for said battery marking, means under the control of the operated one of said primary test relays to connect said other conductors to said secondary test relays, a register and means under the control of said primary test relays and said secondary test relays to operate said register in accordance with a different code also representing said designation.

6. In a telephone system, means for transmitting designations comprising three conductors, a set of terminals marked with ground, high resistance battery and low resistance battery, one of said conductors connected to said ground marked terminal and the others of said conductors connected individually to said battery marked terminals or left disconnected in a code representing one of said designations, primary test relays for testing said conductors for said ground marking, secondary test relays for testing said conductors for said battery marking, means under the control of the operated one of said primary test relays to connect said other conductors to said secondary test relays, a register and means under the control of said primary test relays and said secondary test relays to operate said register in accordance with a different code also representing said designation.

7. In a telephone system, means for transmitting designations comprising three conductors, a set of terminals marked with ground, high resistance battery and low resistance battery, one of said conductors connected to said ground marked terminal and the others of said conductors connected individually to said battery marked terminals or left disconnected in a code representing one of said designations, primary test relays for testing said conductors for said ground marking, secondary test relays for testing said conductors for said battery marking, means under the control of the operated one of said primary test relays to connect said other conductors to said secondary test relays, a register, means under the control of said primary test relays and said secondary test relays to operate said register in accordance with a different code also representing said designation, and means under the control of said ground testing means to further extend said one path to prepare a circuit for operating said control relay.

8. In a telephone system, trunk circuits, a plurality of numbered trunk link frames on which said trunk circuits appear, a control circuit, means for connecting said control circuit with one of said trunk circuits, means in said trunk circuits for transmitting the number of the trunk link frame on which said one trunk appears to said control circuit comprising three circuit paths, means to connect ground to one of said paths and battery to one or both or neither of the remaining paths in accordance with a particular code indicative of the trunk link frame number, means in said control circuit for testing said three paths for ground, means under the control of said ground testing means to test the remaining conductors for battery and means under the joint control of said ground testing means and said battery testing means for setting up a registration of said trunk frame number in accordance with a different code.

9. In a telephone system, trunk circuits, a plurality of numbered trunk link frames on which said trunk circuits appear, a control circuit, means for connecting said control circuit with one of said trunk circuits, means in said trunk circuit for transmitting the number of the trunk link frame on which said one trunk appears to said control circuit comprising three circuit paths, a grounded control relay, means to connect said control relay to one of said paths and battery through resistances of different values to one or both or neither of the remaining paths in accordance with a particular code indicative of the trunk link frame number, means in said control circuit for testing said three paths for ground, means under the control of said ground testing means to test the remaining conductors for battery, means under the joint control of said ground testing means and said battery testing means for setting up a registration of said trunk link frame number in accordance with a different code, and means under the control of said ground testing means to further extend said one path to prepare a circuit for operating said control relay.

RODERICK K. McALPINE.

No references cited.